(12) United States Patent
D'Angelo et al.

(10) Patent No.: US 8,552,670 B2
(45) Date of Patent: Oct. 8, 2013

(54) CONTROL CIRCUIT OF AN ELECTRIC MOTOR WITH A MEASURE DELAY COMPENSATION AND MOTOR SYSTEM COMPRISING THE CIRCUIT

(75) Inventors: Giuseppe D'Angelo, Tufino (IT); Giovanni Moselli, S. Arpino (IT); Virginia Clemente, Montesarchio (IT); Vincenzo Buccino, Marcianise (IT); Carolina Verde, Sant'Antimo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 257 days.

(21) Appl. No.: 13/191,273

(22) Filed: Jul. 26, 2011

(65) Prior Publication Data

US 2012/0025745 A1    Feb. 2, 2012

(30) Foreign Application Priority Data

Jul. 27, 2010    (IT) .............................. MI2010A1385

(51) Int. Cl.
*H02P 6/18*    (2006.01)

(52) U.S. Cl.
USPC ................. 318/400.04; 318/254; 318/400.12; 318/400.13; 318/400.33

(58) Field of Classification Search
USPC ............ 318/400.04, 400.11, 400.12, 400.33, 318/254
See application file for complete search history.

(56) References Cited

U.S. PATENT DOCUMENTS

| | | | |
|---|---|---|---|
| 4,680,515 A * | 7/1987 | Crook ...................... | 318/400.04 |
| 5,903,128 A * | 5/1999 | Sakakibara et al. .......... | 318/721 |
| 6,008,617 A | 12/1999 | Kaneko et al. | |
| 6,194,856 B1 * | 2/2001 | Kobayashi et al. ........... | 318/432 |
| 6,496,340 B1 * | 12/2002 | Hornberger et al. ............ | 361/51 |
| 6,611,771 B1 * | 8/2003 | Habetler et al. ................ | 702/58 |
| 6,704,214 B1 * | 3/2004 | Gibbs et al. ..................... | 363/87 |
| 6,819,069 B2 * | 11/2004 | Hornberger et al. ..... | 318/400.12 |
| 7,088,063 B2 * | 8/2006 | Kurosawa et al. ....... | 318/400.35 |
| 7,294,982 B2 * | 11/2007 | Kurosawa et al. ......... | 318/400.2 |
| 7,570,465 B2 * | 8/2009 | Beatty et al. .................... | 361/42 |
| 8,237,385 B2 * | 8/2012 | Street ....................... | 318/400.34 |
| 2003/0080709 A1 * | 5/2003 | Hornberger et al. .......... | 318/700 |
| 2004/0183498 A1 | 9/2004 | Iwaji et al. | |
| 2005/0067986 A1 * | 3/2005 | Kurosawa et al. ............ | 318/254 |

(Continued)

OTHER PUBLICATIONS

Richardson, J., "Implementation of a PWM Regular Sampling Strategy for AC Drives," IEEE Transactions on Power Electronics 6(4):645-655, 1991.

(Continued)

*Primary Examiner* — Paul Ip
(74) *Attorney, Agent, or Firm* — Seed IP Law Group PLLC (57) ABSTRACT

A control circuit controls an electric motor and includes: a measuring device configured to measure a first phase current of the motor and provide a corresponding first analog signal; an analog-to-digital converter structured to convert the first analog signal into a first digital signal; a conversion module for generating a first converted digital signal representative of the first digital signal expressed in a rotating reference system; a node structured to compare the first converted digital signal into a first reference signal and generate a first error signal; and a measure control circuit structured to provide a timing signal of the analog-to-digital converter depending on the first error signal and a time delay introduced by the measuring device.

26 Claims, 4 Drawing Sheets

(56) References Cited

U.S. PATENT DOCUMENTS

| | | | |
|---|---|---|---|
| 2006/0158142 A1* | 7/2006 | Kurosawa et al. | 318/254 |
| 2009/0161270 A1* | 6/2009 | Beatty et al. | 361/42 |
| 2010/0066287 A1* | 3/2010 | Street | 318/400.34 |
| 2010/0181952 A1* | 7/2010 | Cheng | 318/400.33 |

OTHER PUBLICATIONS

Song, S.-H. et al., "Current Measurements in Digitally Controlled AC Drives," IEEE Industry Applications Magazine, pp. 51-62, Jul./Aug. 2000.

* cited by examiner

CONTROL CIRCUIT OF AN ELECTRIC MOTOR WITH A MEASURE DELAY COMPENSATION AND MOTOR SYSTEM COMPRISING THE CIRCUIT

BACKGROUND

1. Technical Field

The present disclosure refers to the field of the control of electric motors and particularly of triphase electric motors.

2. Description of the Related Art

In the field of the triphase electric motors control, it is known the field oriented control (FOC) technique. Such technique typically uses a pulse width modulation (PWM) known as space vector modulation (SVM), that induces sinusoidal voltages and currents in the motor phases which uses a precise measure of the angular position of the rotor and of the motor phase currents themselves.

The motor phase currents are measured by suitable sensors and the obtained measure signals are converted into digital signals by analog-to-digital converters. The phase currents, initially represented by a stationary three-dimensional system (A, B, C), are represented, by the Clarke and Park transforms, in a rotating bi-dimensional reference system (d, q), integral with the rotor angular position.

In such rotating reference system (d, q), assuming a steady condition and that the control generated voltages are perfectly sinusoidal, the direct axis component $I_d$ and the quadrature component $I_q$ of the motor stator currents are constant so that they can be controlled by a proportional-integral PI controller.

The motor is driven by a PWM-driven inverter which allows to induce in the motor phases a time-varying voltage between the supply voltage and the ground.

It has been observed that the use of the inverter intrinsically generates voltage harmonics overlapped to the fundamental voltage component. Such voltage harmonics generate higher order current harmonics, which can introduce an error in the current fundamental component measure and substantially reduce the control accuracy.

Therefore, it is desirable that the current measures do not contain the contribution of the higher order current harmonics generated by the inverter.

In the article Richardson J.: "Implementation of a PWM Regular Sampling Strategy for AC Drives", IEEE Power Electronics Specialist Conference Report, 1989, pages 649-656, it is shown that the contribution of the higher order current harmonics overlapped to the current fundamental component is zero when the currents are measured at the instant t=0 or at the instant t=T/2 of the PWM modulation period T.

It is to be observed that when the currents are measured at instants different from the above-mentioned ones, the higher order current harmonics contribution, in a steady condition, causes a distortion of the measured current behavior. Such distortion of the measured current causes an oscillation of the values of the currents $I_d$ and $I_q$ entering the controllers PI and therefore a control error increase, defined as the absolute value of the difference between the reference and the controller input.

The Applicant has further noted that, with real applications, sometimes the motor phase currents are filtered, before being digitally converted, by low-pass filters to eliminate the noise affecting the measure accuracy.

However, the use of the filters, even though it reduces the noise contribution, introduces a time delay of the signal to be measured, causing, as a result, the impossibility to measure the currents at the instants in which is zero the contribution of the higher order harmonics.

The document of Seung-Ho Song et al., "Current Measurements in Digitally Controlled AC Drives", IEEE Industry Applications Magazine July/August 2000, pages 51-62, discusses the effects due to the use of low-pass filters in a field oriented control of an inverter-piloted apparatus.

BRIEF SUMMARY

The Applicant has observed also that the delay introduced by the low-pass filter is not determinable a priori, because the value of the electric components used for implementing the filter is known under a tolerance, even if is very small, and the same pattern of the filter, used for computing the delay, is only an approximation of the real conditions. Moreover, this delay is a complex function of the input signal frequency.

The Applicant has further noted that the currents measure delay can be associated not only with the noise reduction filter but also with the interface devices located along the current measure branch and, typically, interposed between the analog-to-digital converter and the device sensing the phase current measured for the control.

One embodiment of the present disclosure is control circuit for an electric motor. The control circuit includes a measuring device configured to measure a first phase current of the motor and provide a corresponding analog signal; an analog-to-digital converter structured to convert the first analog signal into a first digital signal; a conversion module configured to generate a first converted digital signal representative of the first digital signal expressed in a rotating reference system; a node structured to compare the first converted digital signal to a first reference signal and generate a first error signal; and a measure control circuit structured to provide to the analog-to-digital converter a timing signal that depends on the first error signal and is associated with a time delay introduced by the measuring device.

BRIEF DESCRIPTION OF THE SEVERAL VIEWS OF THE DRAWINGS

Other characteristics and advantages of the disclosure will be understood from the following description of a preferred embodiment and of its variants, provided in an illustrative way with reference to the attached drawings, wherein.

DETAILED DESCRIPTION

Figure 1:
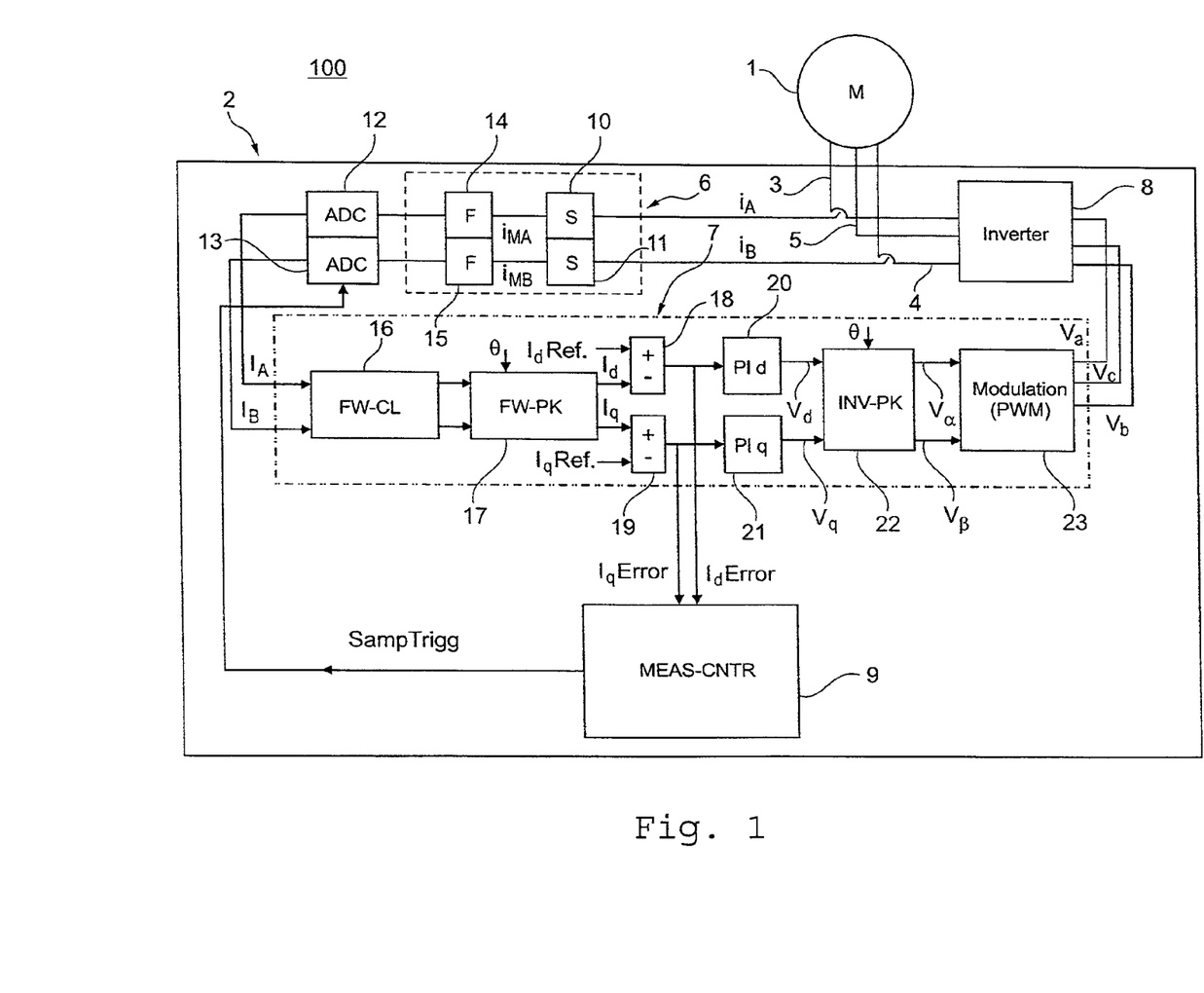
FIG. 1 shows, by functional blocks, an example of a motor system comprising an electric motor and a motor control circuit.

FIG. 1 schematically shows a motor system 100 comprising an electric motor 1 (M) and a control circuit 2. The motor 1 is, particularly, a triphase motor, such as, for example, a synchronous or asynchronous motor, of the permanent magnet type, such as, in particular, a brushless motor. According to a non-limiting specific application, the triphase motor 1 can be used in the automotive field, for example, as a motor of the braking, power-steering and/or transmission systems.

The triphase motor 1, which can be of the conventional type, comprises a plurality of supply terminals comprising a first terminal 3, a second terminal 4 and a third terminal 5. The supply terminals 3, 4 and 5 are suitably connected to the triphase motor 1 stator and they enable its supply in order to cause the triphase motor 1 rotor rotation (elements not shown in the figures).

The plurality of terminals 3-5 are connected to the control circuit 2 comprising a measure branch 6, a control circuit 7, an actuator device 8 and a measure control circuit 9.

The measure branch 6 includes at least one current measuring device (S) and, particularly, it comprises a first current sensor 10, connected to the first terminal 3, and a second current sensor 11 (for example, of a known type) connected to the second terminal 4. The first current sensor 10 is configured to measure a first current $i_A$ and provide a corresponding first analog signal $i_{MA}$, while the second current sensor 11 is configured to measure a second current $i_B$ and provide a corresponding second analog signal $i_{MB}$. The first current $i_A$ and the second current $i_B$ are two of the phase currents of the motor or are related to them.

The first and second current sensors 10 and 11 can be, for example, shunt resistors having a corresponding insulation stage. It has been considered the illustrative case wherein the triphase motor 1 windings are star-connected and therefore only two of the phase currents are measured because the third current can be known from the other two depending on the first Kirchhoff law; otherwise the measures of the three currents are performed.

A first analog-to-digital converter 12 (ADC) is configured to convert the first analog signal $i_{MA}$ into a first digital signal $I_A$ by conventional sampling (according to a period Tc), quantization, and coding steps. According to the example, the measure branch 6 is also provided with a second analog-to-digital converter 13 (ADC), analogous to the first converter 12, arranged for converting the second analog signal $I_{MB}$ into a second digital signal $I_B$.

According to a particular implementation, at the input of the first analog-to-digital converter 12 and of the second analog-to-digital converter 13 there are, respectively, a first noise-removal low-pass filter 14 (F) and a second noise-removal low-pass filter 15 (F), both of the analog type. It is to be observed that such low-pass filters introduce a time delay in the processed signals. Moreover, in addition or as an alternative to the noise-removal low-pass filters, there are also interface devices (for example, adapted to condition the signals provided by the first and second sensors 10 and 11) interposed between the same sensors (or integrated in such sensors) and the first and second analog-to-digital converters 12 and 13. Also these interface devices intrinsically introduce a time delay.

It is to be considered now the control circuit 7 which is connected to corresponding outputs of the first and second analog-to-digital converters 12 and 13 for receiving at the input the first and second digital signals $I_A$ and $I_B$. Such control circuit 7 comprises at least a coordinate conversion module configured to generate output signals representing the measured currents in a rotating reference system.

According to the described implementation, the control circuit 7 operates according to the field oriented control (FOC) technique. In this case, the control circuit 7 comprises a Clarke transformation module 16 configured to process the first and second digital signals $I_A$ and $I_B$, received from the respective analog-to-digital converters 12 and 13 and return further digital signals representing phasors of the stator currents represented by a two-axis orthogonal system. It is to be observed that the Clarke transformation module 16 could also process a third digital signal $I_c$ representative of the measure of the third motor phase current.

Moreover, the FOC-type control circuit 7 is provided with a Park transformation module 17 (FW-PK) which is configured to process the signals returned by the Clarke transformation module 16 and return a first converted digital signal $I_d$ and a second converted digital signal $I_q$. The Park transformation module 17 enables to express the current phasors in a bidimensional rotating reference system (d, q) integral with the angular position of the triphase motor 1 rotor. The Park transformation is performed by considering an angle θ representative of the angular position of the triphase motor 1 rotor.

Thanks to these transformations, the first converted digital signal $I_d$ is representative of the component of the direct axis stator current and the second converted digital signal $I_q$ is representative of the quadrature stator current component.

The control circuit 7 also includes a first comparison node 18 structured to compare the first converted digital signal $I_d$ with a first reference signal $I_d$Ref and providing a first error signal $I_d$Error. A second comparison node 19 is structured to compare the second converted digital signal $I_q$ with a second reference signal $I_q$Ref and generate a second error signal $I_q$Error. The first reference signal $I_d$Ref and the second reference signal $I_q$Ref are constant signals.

Referring again to the control circuit 7, it is also provided with a first controller module 20 such as, for example, a first proportional-integral controller (PI d) and, for example, a second controller module 21, such as, particularly, a second proportional-integral controller (PI q).

According to a specific control mode, by performing the control by keeping at zero the first reference signal $I_d$Ref, the torque produced by the triphase motor 1 is proportional to the quadrature current value $I_q$, so that the current control performed by the first proportional-integral controller 20 equals a torque control of the triphase motor 1. According to another mode, by using the second proportional-integral controller 21, operating on the quadrature current $I_q$, it is obtained a speed control and/or a position control of the triphase motor 1. The outputs of the first and second controllers PI 20 and 21 provide a direct voltage signal $V_d$ and a quadrature voltage signal $V_q$.

The control circuit 7 comprises also an inverse Park transformation module 22 (INV-PK), already known, which is configured to process the direct voltage signal $V_d$ and the quadrature voltage signal $V_q$ and express them by a stationary reference, by providing a first voltage signal $V_\alpha$ and a second voltage signal $V_\beta$.

A modulation block 23 connected to the inverse Park transformation module 22 is arranged for generating, based on the first voltage signal $V_\alpha$ and second voltage signal $V_\beta$ (operating as modulating signals), three voltage signals $v_a$, $v_b$, and $v_c$ adapted to be supplied to the actuator 8.

For example, the modulation block 23, as illustratively shown in FIG. 1, performs a pulse width modulation (PWM) which can be of the SVM type, or can be an inverse Clarke transformation block.

The actuator 8 is, according to the described implementation, an inverter arranged for providing to the triphase motor 1 stator windings three corresponding alternate current signals $i_{sa}$, $i_{sb}$, $i_{sc}$, obtained depending on the PWM voltage signals $v_a$, $v_b$, and $v_c$ received by the modulation block 23.

It should be considered now the measure control circuit 9, which is structured to provide a timing signal SampTrigg to the first analog-to-digital converter 12 and, according to the example, also to the second analog-to-digital converter 13.

As it will be better understood in the following, such timing signal SampTrigg depends on at least one of the error signals $I_d$Error and $I_q$Error and is indicative also of a delay introduced by the measure branch 6. Particularly, the timing signal SampTrigg is such to time the operation of the first and second analog-to-digital converters 12 and 13 (by setting the sampling period) in order to compensate the delay that the measure branch 6 introduces in the phase current measure.

Figure 2:
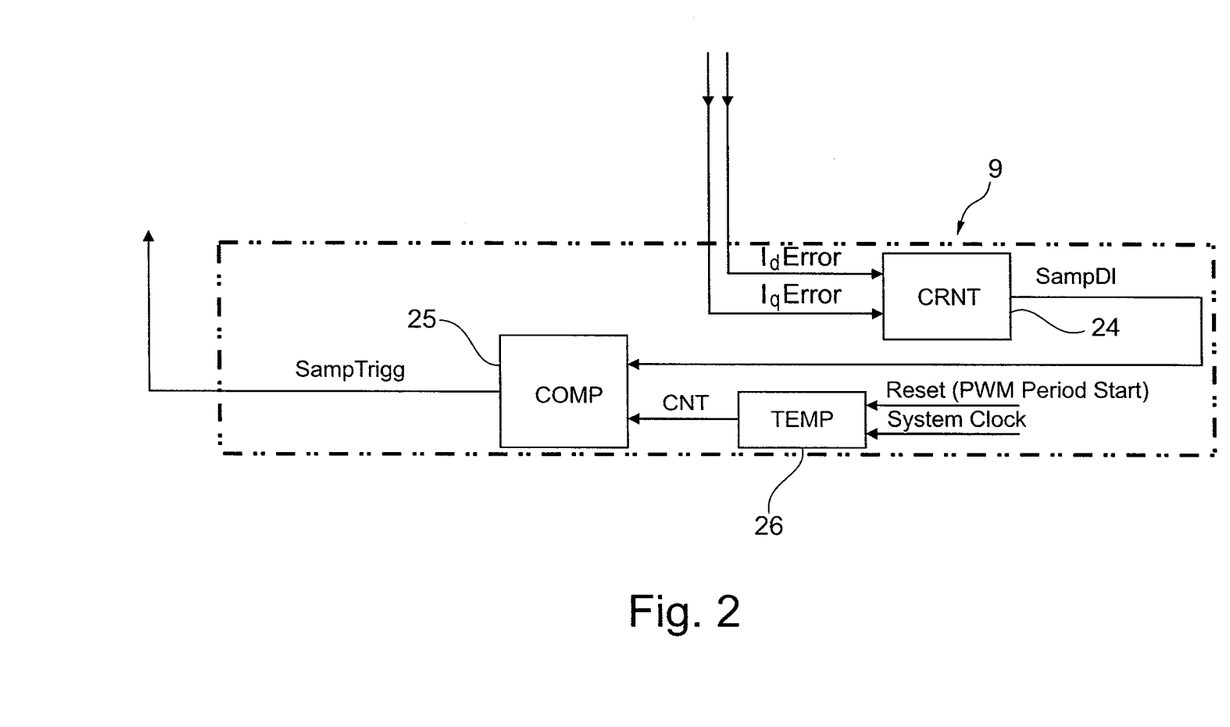
FIG. 2 shows a particular embodiment of the measure control circuit, used in said motor control circuit.

FIG. 2 shows a particular implementation of the measure control circuit 9, comprising a controller module 24 (CRNT), a comparator 25 (COMP) and, according to an example, a timer 26 (TEMP).

According to a first implementation, the controller module 24 is configured to receive at first and second inputs the first error signal $I_d$Error and second error signal $I_q$Error, which comprise the contribution due to a time delay existing between the corresponding reference signals $I_d$Ref and $I_q$Ref and the converted digital signals $I_d$ and $I_q$, a delay associated with the measure branch 6.

The controller module 24 is further configured to generate a sampling delay signal SampDI adapted to minimize one or both the error signals present at its input.

It is to be observed, according to a first implementation, that as an input signal to the controller module 24 can be chosen the first error signal $I_d$Error or the second error signal $I_q$Error. According to specific implementation, the controller module 24 is such to operate on the absolute value of the error signal present at its input.

According to another implementation, the controller module 24 can act not just on the single instantaneous value of the error signal at its input, but on the sum of the last n values, in other words the controller module 24 will minimize the sum of the absolute values of the last n values of the error, such as for example the second error signal $I_d$Error.

According to another example, the controller module 24 can operate also using as input the sum of the absolute values of the two error signals $I_d$Error and $I_q$Error which can be also weighted in a different way by multiplicative coefficients.

The timer 26 is a counter structured to receive at its inputs a clock pulsed signal CK and a reset signal RS, coincident with a signal having a period T equal to the period of the PWM signals generated by the modulator 23. The timer 26 counts the clock pulses from instant 0 in the period T and is reset at the beginning of each period.

The comparator 25 compares the sampling delay signal SampDI provided by the controller module 24 with the count signal CNT and, when the sampling delay signal equals the count signal, it generates the timing signal SampTrigg activating the acquisition of the measured currents and, in other words, it activates the acquisition of the first and second digital signals $I_A$ and $I_B$ by the first analog-to-digital converter 12 and second analog-to-digital converter 13.

The control circuit 2 can be implemented by hardware and/or software and, for example, by a microcontroller of the ST10/SPC type.

Operative Example

Referring to the operation of the motor system 100 and particularly to the control circuit 2, the first and second digital signals $I_A$ and $I_B$, initially represented in a stationary three-dimensional reference system, are represented in a rotating bi-dimensional reference system (d, q), integral with the angular position of the triphase motor 1 rotor by the Clarke and Park transforms associated with the modules 16 and 17.

The first converted digital signal $I_d$ and second converted digital signal $I_q$ are therefore supplied to the first and the second nodes 18 and 19 for generating the first and the second error signals $I_d$Error and $I_q$Error.

The first integral proportional controller 20 and the second integral proportional controller 21 receive at their inputs the first and second error signals $I_d$Error and $I_q$Error respectively and, according to the example, enable the control of the motor 1 torque, and the speed and/or position of the rotor.

The voltage signals $V_a$, $V_b$, and $V_c$ supplied to the inverter 8 are generated by the inverse transformation module 22 and the PWM modulator 23.

It is to be observed that, as said before, the use of the inverter 8, as it happens with the FOC technique for inducing in the motor phases a time-varying voltage between the supply voltage and the ground, intrinsically generates voltage harmonics overlapped to the fundamental component of the voltage itself.

Such voltage harmonics generate higher order current harmonics overlapped to the fundamental component of the current itself, which can, when the current measure is not suitably carried out, introduce a measure error of the fundamental component of the currents and substantially reduce the accuracy of the FOC control.

Therefore, it is desirable that the current measures are substantially devoid of the contribution due to the higher order current harmonics generated by the inverter 8.

Figure 3:
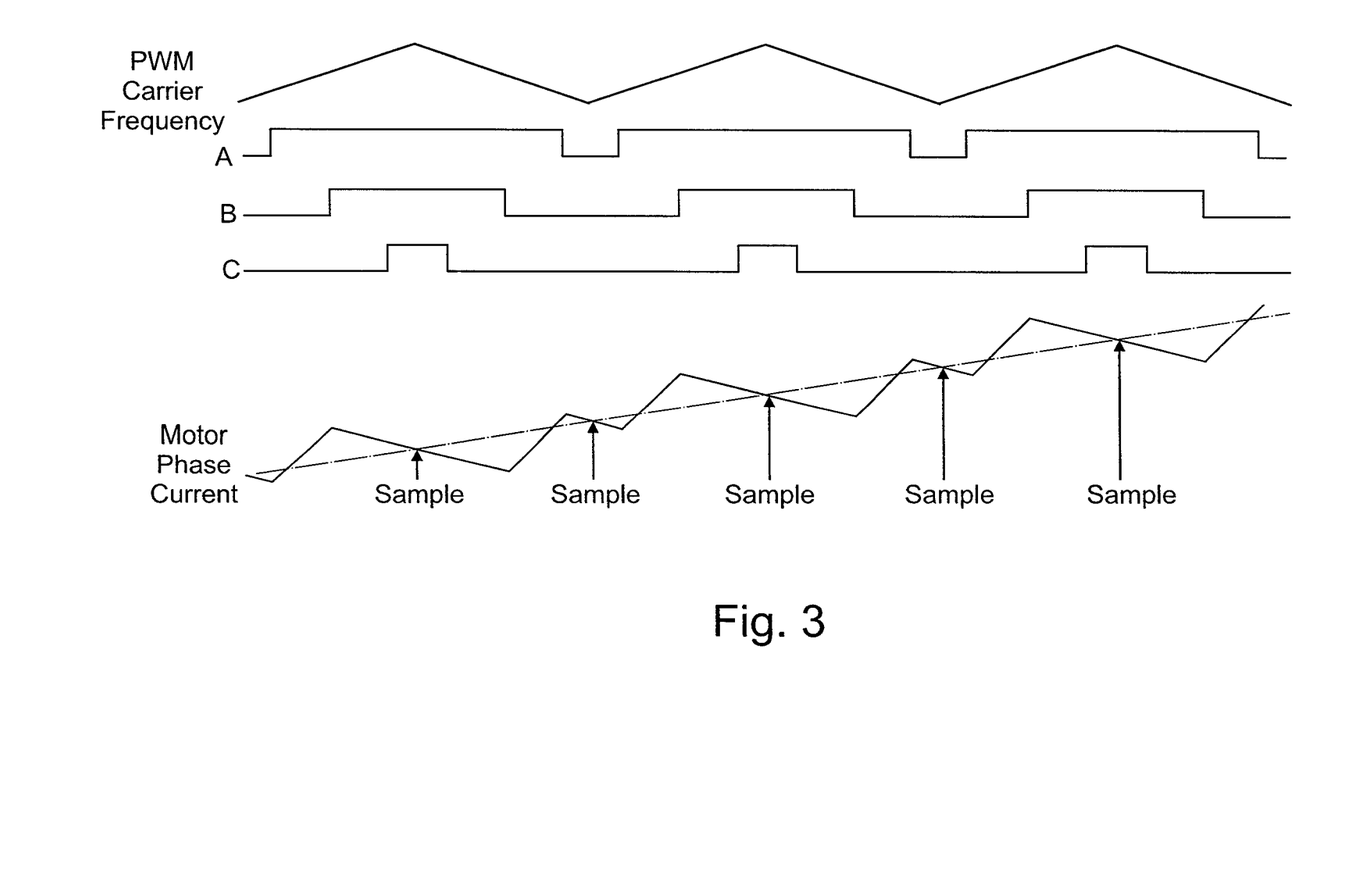
FIG. 3 shows examples of signal behaviors which can be processed by the motor control circuit.

In order to avoid such contribution, the currents should be measured in predetermined instants, and as shown in the paper of Richardson J., "Implementation of a PWM Regular Sampling Strategy for AC Drives", IEEE Power Electronics Specialist Conference Record, 1989, pages 649-656, the contribution of the higher order current harmonics overlapped to the fundamental component of the current is zero when the currents are measured at the instant t=0 or at the instant t=T/2 of the PWM modulation period T as shown in FIG. 3.

FIG. 3 shows an illustrative behavior of the carrier signal (triangular) used by the PWM modulator 23, and the behaviors A, B and C of the voltage signals $V_a$, $V_b$, and $V_c$ exiting the PWM module itself. Moreover, FIG. 3 illustratively shows by a broken line the fundamental harmonic behavior of one of the phase currents, while the continuous line represents the behavior of the total phase current.

As it is shown in FIG. 3, by measuring the current at suitable instants (indicated by the arrows Sample), it is possible to eliminate the higher order current harmonic contribution.

It is to be observed that when the currents are measured at instants different from the ones previously determined, the higher order current harmonics contribution, in a steady condition, causes a distortion of the measured current behavior which is no longer sinusoidal, that is it is no longer equal the behavior of the current fundamental component.

Such distortion of the measured current causes, in the rotating bi-dimensional reference system, (d, q) integral with the rotor, an oscillation of the values of the converted signals $I_d$ and $I_q$ at the input of the nodes 18 and 19 before the controllers PI 20 and 21. This corresponds to an increase of the absolute value of the error signals $I_d$Error and $I_q$Error.

Moreover, it is to be observed that the measure branch 6, because of the possible presence of the filters 14 and 15, and the interface devices before the analog-to-digital converters 12 and 13, can introduce a delay in the phase current measure which cannot be determined a priori, because the value of the electric components used for their implementation is known except for a very small tolerance. Moreover, the pattern itself of the filter, used for computing the delay, is an approximation, and this delay is a complex function of the input signal frequency.

The effect of a delay on the accuracy of the motor phase current measure is substantial in that the contribution of the higher order current harmonics overlapped to the current fundamental component is not constant, but varies according to the rotor angular position and reverses also its sign.

Therefore, it is not a plain systematic error, but a distortion translating in an oscillation of the values of the currents $I_d$ and $I_q$ entering the nodes 18 and 19 located before the controllers PI 20 and 21, and naturally in an increase of the control error.

The measure control circuit 9 enables to reduce and substantially compensate the negative effects of this time delay introduced by the measure branch 6. The controller module 24 performs a control law minimizing one or more signals present at its input. The comparator 25 generates the timing signal SampTrigg with which it drives the analog-to-digital converters 12 and 13 (in other words, it generates the signal indicating the instant at which the current measures are performed), just as the controller module 24 output equals the timer 26 counter value.

In this way, the digital acquisition of the digital signals $I_A$ and $I_B$, representing the phase currents occurs for certain at instants close or coincident with those equal to the period T of the PWM modulator 23, or equal to T/2, therefore it is certain a substantial absence of the higher order harmonics.

It is to be observed that the measure control circuit 9 can be used without delays substituting the controller 24 output with a constant equal to zero or T/2 wherein T is the modulation period so that the currents are measured at the instant t=0 or the instant t=T/2 of the modulation period.

Comparison Simulations

The Applicant has performed some computer simulations by using a simulation platform in a MATLAB/Simulink environment implementing a FOC control and a circuit diagram analogous to the one described with reference to FIGS. 1 and 2. In this case, the FOC-type control provided a direct axis $I_d$ component of the stator current controlled by a PI controller 20 at zero and the quadrature component $I_q$ controlled by a PI controller 21 at a value of 40 Amperes.

Further, the simulated system performed the control voltages on the three phases on the motor 1 by a simulated triphase inverter 8. Therefore, the analyzed system was capable to simulate the presence of the higher order current harmonics overlapped to the fundamental components of the phase currents of the motor and their deforming effect in presence of delays between the signals to be measured and the analog-to-digital converters ADC used for the simulated measures.

For each motor 1 phase, a corresponding analog-to-digital converter ADC is used. Each ADC was operated by the drive signal generated by the comparator 25: when an ADC receives the drive signal, it instantaneously performs the measure of the phase relative current of the motor 1. Analogously to what has been written about the circuit of FIG. 2, also for this simulation, when the timer 26 value equals the value of the measure constant, the comparator 25 automatically outputs the timing signal. The delays associated to the measure branch 6 are simulated by three delay blocks DELAY relating to each current and located at the inputs of the three analog-to-digital converters, respectively.

According to a first test, the drive constant initially took a value 0 that is, at the input of the comparator 24 there was a zero delay signal simulating a condition without delays. Therefore, without delays, that is in case the blocks DELAY introduce a zero delay, the phase current measure is always performed at the instant t=0 of the modulation period T and therefore it is zero the contribution of the higher order harmonics overlapped to the fundamental one.

In these steady conditions, the error of the PI controller 21 relating to the quadrature current $I_q$, computed as an average of the absolute value of the difference between the current value and the reference was equal to 3.556366033808445e−05.

Such error, being computed in a simulation environment, is not affected by the contribution due to the noise overlapped to the measured signal and, since the simulation is done without delays and the measures are always performed at the instant t=0 of the modulation period T, it is not affected by the contribution due to the deforming effect of the higher order current harmonics overlapped to the fundamental component.

In view of this, leaving unchanged all the parameters of the simulation and, particularly, the gain constants of the controllers PI, this error value is the theoretic one which the error signal $I_q$Error at the input of the PI controller 21 relating to the quadrature current $I_q$ should approach, with a delay different from zero thanks to the compensation action performed by the measure control circuit 9.

Some simulations have been performed with different delay values, referring to a control circuit 2 of the conventional type and therefore a circuit which did not have the measure control circuit 9. This case, corresponding to the conventional FOC technique, has been simulated by providing a constant or zero sampling delay signal SampDI at the input of the comparator 25.

In addition, other simulations have been done with different delay values and by simulating the operation of the measure control circuit 9.

Table 1 shows errors $I_q$Error at the input of the PI controller 21 relating to the quadrature current $I_q$ in case of a not compensated delay (prior art) and in case of a compensated delay, by using the measure control circuit 9.

TABLE 1

| Error PI($I_q$) | | |
| --- | --- | --- |
| not compensated Error PI($I_q$) | compensated Error PI($I_q$) | Delay [µs] |
| 7.916824243754187e−05 | 4.183874188189899e−05 | 10 |
| 4.300935364032436e−05 | 4.369858437833803e−05 | 20 |
| 9.494687612823327e−05 | 4.532262445354718e−05 | 40 |

It is possible to observe by comparing the values shown in Table 1, that the use of the measure control circuit 9 reduces the PI controller error relating to the quadrature current $I_q$ and enables to approach the minimum theoretic value of 3.556366033808445e−05 computed in a steady state with a zero delay.

Figure 4:
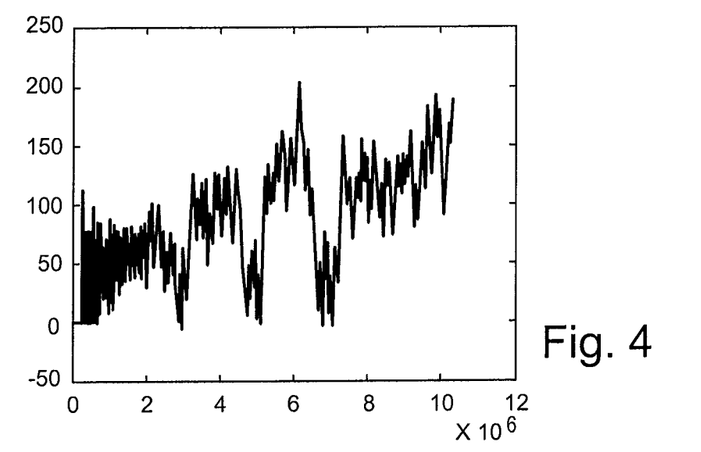
FIGS. 4, 5 and 6 show different behaviors of a signal exiting said measure control circuit, obtained by simulations in different operative conditions.
Figure 5:
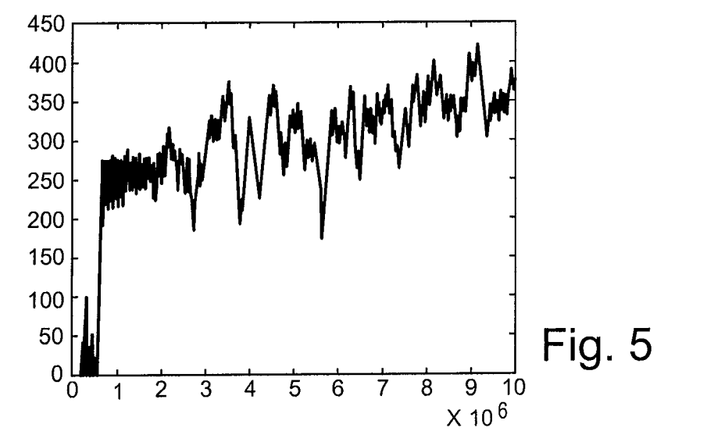
Figure 6:
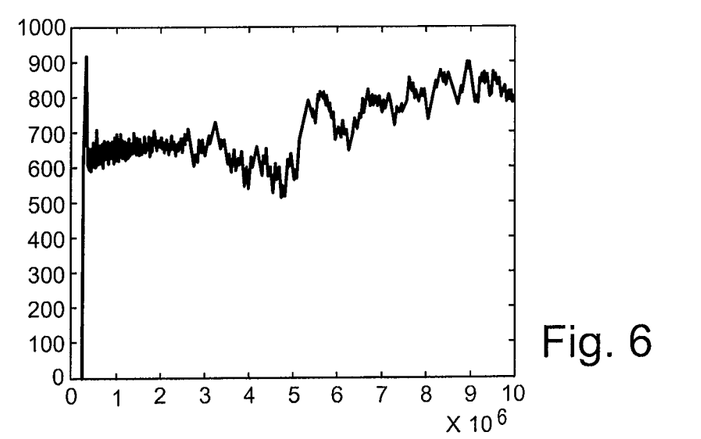

Actually, assuming the modulation period T duration was of 50 µs and the frequency of the system clock was 20 MHz, the modulation period corresponds to 1000 pulses, therefore a possible delay, for example, of 10 µs corresponds to 200 pulses, and the output value of the measure control circuit 9 approaches 200 when the set delay is of 10 µs. Regarding this, the behavior at the comparator 25 output in this situation is shown in FIG. 4. Moreover, FIGS. 5 and 6 show the comparator 25 outputs when the delay equals 20 µs and 40 µs respectively.

In view of this, it is to be noted that the controller module is useful for detecting the set delay and therefore enables to compensate for by providing the right input to the comparator 25.

The motor system 100 and the described control circuit 2 are particularly advantageous in that they enable to compensate for delays associated with the measure of currents, by avoiding the negative effect that such delays have on the performances of the whole system.

In addition, the described control circuit 2 enables to use filters for avoiding that the measures are affected by noise, eliminating the disadvantage of their use typical of the prior art technique and increasing their benefits.

The use of the measure control circuit 9 does not cause excessive hardware and/or software complications with respect to the conventional control circuits for electric motors.

The various embodiments described above can be combined to provide further embodiments. All of the U.S. patents, U.S. patent application publications, U.S. patent application, foreign patents, foreign patent application and non-patent publications referred to in this specification are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for an electric motor comprising:
   a measuring device configured to measure a first phase current of the motor and provide a corresponding analog signal with a time delay;
   an analog-to-digital converter structured to convert the first analog signal into a first digital signal;
   a conversion module configured to generate a first converted digital signal representative of the first digital signal expressed in a rotating reference system;
   a comparison node structured to compare the first converted digital signal to a first reference signal and generate a first error signal; and
   a measure control circuit structured to provide to the analog-to-digital converter a timing signal that depends on the first error signal and the time delay.

2. The circuit according to claim 1, wherein the measure control circuit comprises:
   a controller configured to generate, from the first error signal, a time delay signal indicative of the time delay;
   a counter configured to generate a count signal of timing pulses;
   a comparator structured to compare the time delay signal to the count signal and generate the timing signal based on said comparison.

3. The circuit according to claim 1, wherein said measure control circuit is configured to minimize the first error signal.

4. The circuit according to claim 3, wherein the measure control circuit is configured to minimize an absolute value of the first error signal.

5. The circuit according to claim 3, wherein the measure control circuit is configured to compute a quantity equal to a sum of absolute values of a plurality of values taken from the first error signal and to minimize said quantity.

6. The circuit according to claim 5, wherein the measure control circuit is configured to compute said quantity in the form of a weighted sum of values by using multiplicative coefficients.

7. The circuit according to claim 1, wherein the measuring device comprises:
   a first current sensor configured to provide a first measure signal to be provided to said analog-to-digital converter.

8. The circuit according to claim 7, wherein said measuring device further comprises at least one of the following devices interposed between the analog-to-digital converter and the first current sensor and suitable to introduce a time delay: a noise removal filter and a signal adjustment interface.

9. The circuit according to claim 1, wherein said control circuit is configured to control a tri-phase electric motor and further comprises:
   a control and actuator circuit structured to provide the motor with at least said first phase-current and structured to operate according to a Field Oriented Control technique.

10. The circuit according to claim 9, wherein said conversion module comprises a Clarke transformation module and a Park transformation module structured to process said first digital signal.

11. The circuit according to claim 9, wherein the control and actuator circuit comprises:
    a first controller configured to generate a first controlled signal from the first error signal;
    an inverse transformation module structured to process said first controlled signal and express the first controlled signal in a fixed-coordinate system by providing a first modulating controlled signal;
    a modulator structured to generate, from said first modulating controlled signal, a modulated electric signal having a modulation period; and
    an inverter configured to be connected to the electric motor and structured to provide the first phase current to the electric motor based on said first modulated electric signal.

12. The control circuit according to claim 11, wherein the measure control circuit comprises:
    a second controller configured to generate, from the first error signal, a time delay signal indicative of the time delay;
    a counter configured to generate a count signal of timing pulses, wherein said counter is structured to count pulses within the modulation period; and
    a comparator structured to compare the time delay signal to the count signal and generate the timing signal of the analog-to-digital converter based on said comparison.

13. The control circuit according to claim 1, wherein:
    the measuring device is configured to provide a second analog signal corresponding to a measure of a second phase-current of the electric motor;
    the analog-to-digital converter is structured to convert the second analog signal into a second digital signal;
    the conversion module is structured to generate a second converted digital signal representative of the second digital signal expressed in a rotating reference system;
    the comparison node is structured to compare the second converted digital signal to a second reference signal and generate a second error signal.

14. The control circuit according to claim 13, wherein the measure control circuit is configured to receive the first and the second error signals and generate the timing signal according to the first and the second error signals.

15. A motor system comprising:
    a tri-phase electric motor having terminals for receiving phase currents; and
    a control circuit configured to control the tri-phase motor, the control circuit including:
       a measuring device configured to measure a first phase current of the motor and provide a corresponding analog signal with a time delay;

an analog-to-digital converter structured to convert the first analog signal into a first digital signal;

a conversion module configured to generate a first converted digital signal representative of the first digital signal expressed in a rotating reference system;

a comparison node structured to compare the first converted digital signal to a first reference signal and generate a first error signal; and a measure control circuit structured to provide to the analog-to-digital converter a timing signal that depends on the first error signal and the time delay.

16. The motor system according to claim 15, wherein the measure control circuit comprises:

a first controller configured to generate, from the first error signal, a time delay signal indicative of the time delay;

a counter configured to generate a count signal of timing pulses;

a comparator structured to compare the time delay signal to the count signal and generate the timing signal based on said comparison.

17. The motor system according to claim 15, wherein the measure control circuit is configured to compute a quantity equal to a sum of absolute values of a plurality of values taken from the first error signal and to minimize said quantity.

18. The motor system according to claim 15, wherein the measuring device comprises:

a first current sensor configured to provide a first measure signal to be provided to said analog-to-digital converter; and at least one of the following devices interposed between the analog-to-digital converter and the first current sensor and suitable to introduce a time delay: a noise removal filter and a signal adjustment interface.

19. The motor system according to claim 15, wherein:

said control circuit further comprises a control and actuator circuit structured to provide the motor with at least said first phase-current and structured to operate according to a Field Oriented Control technique; and said conversion module comprises a Clarke transformation module and a Park transformation module structured to process said first digital signal.

20. The motor system according to claim 15, wherein said control circuit further comprises a control and actuator circuit structured to provide the motor with at least said first phase-current and includes:

a first controller configured to generate a first controlled signal from the first error signal;

an inverse transformation module structured to process said first controlled signal and express the first controlled signal in a fixed-coordinate system by providing a first modulating controlled signal;

a modulator structured to generate, from said first modulating controlled signal, a modulated electric signal having a modulation period; and an inverter configured to be connected to the electric motor and structured to provide the first phase current to the electric motor based on said first modulated electric signal.

21. The motor system according to claim 20, wherein the measure control circuit comprises:

a second controller configured to generate, from the first error signal, a time delay signal indicative of the time delay;

a counter configured to generate a count signal of timing pulses, wherein said counter is structured to count pulses within the modulation period; and a comparator structured to compare the time delay signal to the count signal and generate the timing signal of the analog-to-digital converter based on said comparison.

22. The motor system according to claim 15, wherein:

the measuring device is configured to provide a second analog signal corresponding to a measure of a second phase-current of the electric motor;

the analog-to-digital converter is structured to convert the second analog signal into a second digital signal;

the conversion module is structured to generate a second converted digital signal representative of the second digital signal expressed in a rotating reference system;

the comparison node is structured to compare the second converted digital signal to a second reference signal and generate a second error signal.

23. The motor system according to claim 22, wherein the measure control circuit is configured to receive the first and the second error signals and generate the timing signal according to the first and the second error signals.

24. A control method for controlling an electric motor comprising:

measuring a first phase current of the motor and providing a corresponding analog signal with a time delay;

converting, using an analog-to-digital converter, the first analog signal into a first digital signal;

generating a first converted digital signal representative of the first digital signal expressed in a rotating reference system;

comparing the first converted digital signal to a first reference signal and generating a first error signal based on the comparing; and providing to the analog-to-digital converter a timing signal that depends on the first error signal and the time delay.

25. The method according to claim 24, comprising:

generating, from the first error signal, a time delay signal indicative of the time delay;

generating a count signal of timing pulses; and comparing the time delay signal to the count signal and generating the timing signal based on said comparing.

26. The method according to claim 24, comprising:

generating a first controlled signal from the first error signal;

processing said first controlled signal and express the first controlled signal in a fixed-coordinate system by providing a first modulating controlled signal;

generating, from said first modulating controlled signal, a modulated electric signal; and providing the first phase current to the electric motor based on said first modulated electric signal.

* * * * *